(12) United States Patent
Pringle, Jr.

(10) Patent No.: US 6,818,876 B1
(45) Date of Patent: Nov. 16, 2004

(54) SCINTILLATION-IMMUNE ADAPTIVE OPTICS RECONSTRUCTOR

(75) Inventor: Ralph Pringle, Jr., Albuquerque, NM (US)

(73) Assignee: B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/333,783

(22) Filed: Jun. 15, 1999

(51) Int. Cl.[7] .................................................. G01J 1/20
(52) U.S. Cl. .................................................. 250/201.9
(58) Field of Search ........................ 250/201.9, 201.1, 250/234; 359/224, 290, 291; 356/121

(56) References Cited

U.S. PATENT DOCUMENTS

| | | | | |
|---|---|---|---|---|
| 4,271,355 A | * | 6/1981 | Wisner et al. ............ | 250/201.9 |
| 4,724,404 A | * | 2/1988 | Cochran ..................... | 359/846 |
| 4,750,818 A | * | 6/1988 | Cochran | |
| 4,825,062 A | * | 4/1989 | Rather et al. ............ | 250/201.1 |
| 6,163,381 A | * | 12/2000 | Davies et al. ............... | 356/521 |
| 6,278,100 B1 | * | 8/2001 | Friedman et al. | |

* cited by examiner

Primary Examiner—Thanh X. Luu
(74) Attorney, Agent, or Firm—Calfee, Halter & Griswold LLP; David R. Percio

(57) ABSTRACT

A method and apparatus for producing a scintillation-immune adaptive optics reconstructor is disclosed. The present invention includes a wavefront sensor (70) which determines illumination slope and amplitude of a number of subapertures (75). The slope and amplitude information is coupled to a slope weighting function (90), which weights the slopes of each subaperture (75) according to the amplitude of illumination of each subaperture. The present invention determines the variation in light amplitude received by the subapertures (75) and determines a slope of the light amplitude variation. The signal gain of the imaging system is then adjusted depending on the slope of the light amplitude variation, thereby yielding a closed-loop system that compensates for amplitude disturbances caused by scintillations in the images received by the imaging system (10).

15 Claims, 4 Drawing Sheets

SCINTILLATION-IMMUNE ADAPTIVE OPTICS RECONSTRUCTOR

BACKGROUND OF THE INVENTION (a) Field of the Invention

The present invention relates generally to adaptive optics systems and, more particularly, to a method for reducing the effects of scintillations on an adaptive optics system.

(b) Description of Related Art

Atmospheric turbulence, which makes the stars appear to twinkle, makes it difficult for earth-stationed optical systems to render clear images of objects outside the earth's atmosphere. Atmospheric turbulence disrupts the wavefront of optical energy as it passes through the atmosphere. Adaptive optics systems, which are known, adjust the phase of received optical energy. When an optical signal is received, its wavefront may be uneven. That is, some segments of the wavefront may lead others. The primary function of an adaptive optics system is to align all segments of the wavefront so that the optical signal may be precisely viewed. Adaptive optics systems reflect incoming optical energy off of a deformable mirror that is divided into a number of movable zones. The adaptive optics system determines how much each segment of the wavefront is out of phase using a wavefront sensor and a reconstruction matrix. After processing the optical signals, the system generates commands, which are filtered and passed to actuators that are used to adjust the zones of the mirror into proper positions to compensate for the uneven wavefront. That is, the mirror is deformed in such a way that any wavefront segment arriving later than another actually travels a shorter distance to a focal point of the adaptive optics system. The adaptive optics system is used to alleviate the optical distortion caused by the atmosphere. This method of adaptive optics is iterated hundreds of times per second by a control system. Mirrors used in adaptive optics systems may have hundreds of movable zones. Adaptive optics systems are used in a wide variety of applications such as telescopes, laser control and guidance systems, and optical communication systems.

In addition to disrupting the phase of the optical wavefront, atmospheric turbulence causes fluctuations in the amplitude of optical signals received through the atmosphere. These amplitude fluctuations are referred to as scintillations. Scintillations may significantly degrade the performance of an optical system in comparison to the same system without scintillations. The performance measure of an optical system is the Strehl ratio, which is the ratio of received signal quality with an atmosphere to the received signal quality without an atmosphere. The Strehl ratio of an optical system may be degraded by as much as 90% when scintillations are present. Scintillations have a more severe impact on systems using coherent optical energy (e.g., lasers) than on broadband energy (e.g., energy from a star).

Historically, telescope operations have been confined to mountain-top locations to reduce the effects of scintillations. Additionally, telescope operation has been typically restricted to angles of elevation greater than 45° to limit the amount of atmosphere through which the optical signal must propagate, thereby reducing the effects of scintillations on system performance. As communication and defense technology advances, the need to operate non-mountain-based optical systems at low angles of elevation has increased. These optical systems need to operate as effectively as possible, unhampered by scintillations.

A traditional method of mitigating the effects of scintillation includes signal processing using weighted sensor measurements using a least square method and a constant reconstruction matrix. Systems such as these merely absorb the errors created by scintillations provided scintillations are not very strong. This approach has proved acceptable in the past because, as noted, telescopes and other optical systems have limited operation to elevation angles above 45° and the systems were receiving broadband optical energy. The least square method of weighting is computationally intensive and, therefore, requires substantial computing power to iterate the necessary calculations hundreds of times per second.

Another method for reducing the effects of scintillations employs a variable reconstruction matrix in combination with the least square weighting of measurements. This method, while effective in reducing scintillation effects, is computationally intensive. That is, not only must the measurement weighting be recalculated hundreds of times per second, but the reconstruction matrix must also be recalculated. It is worth noting that the computation of the reconstruction matrix, while known in the art, is not trivial even given the present state of computational ability. Additionally, the response of a system calculating both weighting factors and a reconstruction matrix is poor. That is, computational convergence for the reconstruction matrix components is fast in eliminating large errors and slow in eliminating small errors. This poor response is due to some of the roots of the characteristic equation, which determine the transient response of the control system, being very close to one another (very slow response) and some roots having real parts near one-half (fast, damped response).

Therefore, there exists a need for a computationally efficient method that eliminates the effects of scintillation on an adaptive optics system.

SUMMARY OF THE INVENTION

In one embodiment the present invention is an adaptive optics system for minimizing the effects of scintillations on images received by the adaptive optics system. The present invention includes a deformable mirror that is illuminated with optical energy, a plurality of actuators for moving portions of the deformable mirror, and a wavefront sensor comprising a plurality of subapertures for receiving optical energy that is reflected from the deformable mirror and for determining a slope and amplitude of the optical energy in each subaperture. The present invention further includes a slope weighting function in communication with the wavefront sensor for receiving the slope and amplitude information for each subaperture from the wavefront sensor and for processing the slope and amplitude information and a matrix multiplier in communication with the slope weighting function for receiving the processed slope and amplitude information and for generating control signals that control the actuators.

In an alternative embodiment the present invention may be embodied in a method for minimizing the effects of scintillations on images received by the adaptive optics system. The method includes the steps of illuminating a deformable mirror with optical energy, receiving optical energy from the deformable mirror in a plurality of subapertures, determining a slope and amplitude of the optical energy received by each subaperture, processing the slope and amplitude information to weight slope measurements, and moving portions of the deformable mirror using a plurality of actuators.

The invention itself, together with further objects and attendant advantages, will best be understood by reference

DESCRIPTION OF THE PREFERRED EMBODIMENTS

The present invention is embodied in a method and apparatus for reducing or eliminating the effect of scintillations on an adaptive optics imaging system. An adaptive optics imaging system is a closed loop system that constantly adjusts the position of actuators that change the position of portions of the deformable mirror. Conventionally, imaging systems only compensate for phase disturbances of received optical energy. An imaging system typically includes a number of subapertures disposed between the actuators. The present invention determines the variation in light amplitude received by the subapertures of the imaging system and determines a slope of the light amplitude variation. The signal gain of the imaging system is then adjusted depending on the slope of the light amplitude variation, thereby yielding a closed-loop system that not only compensates for wavefront disturbances, but also compensates for amplitude disturbances in the images received by the imaging system.

Figure 1:
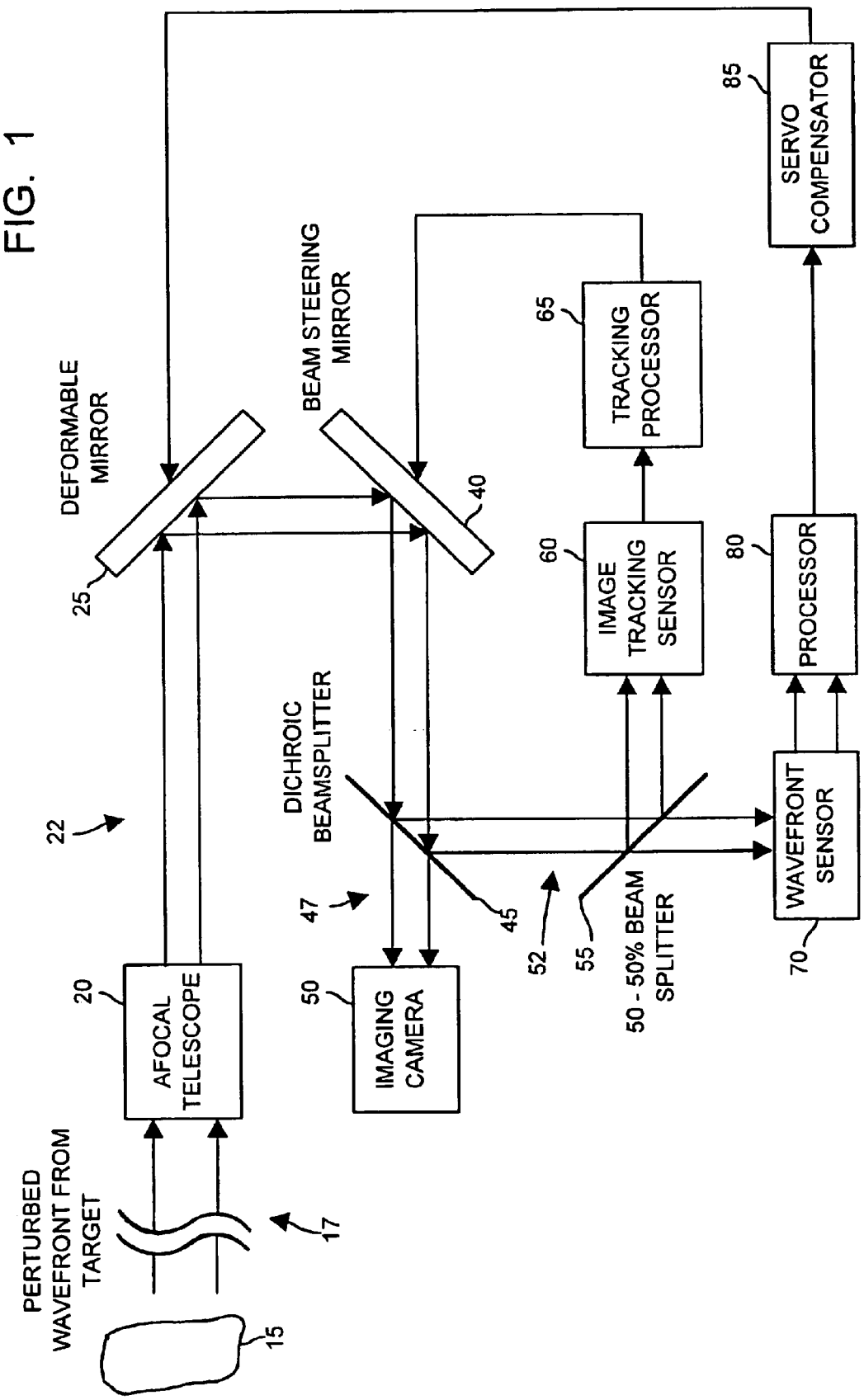
FIG. 1 is a block diagram of an adaptive optics system that may employ the present invention.
Figure 2:
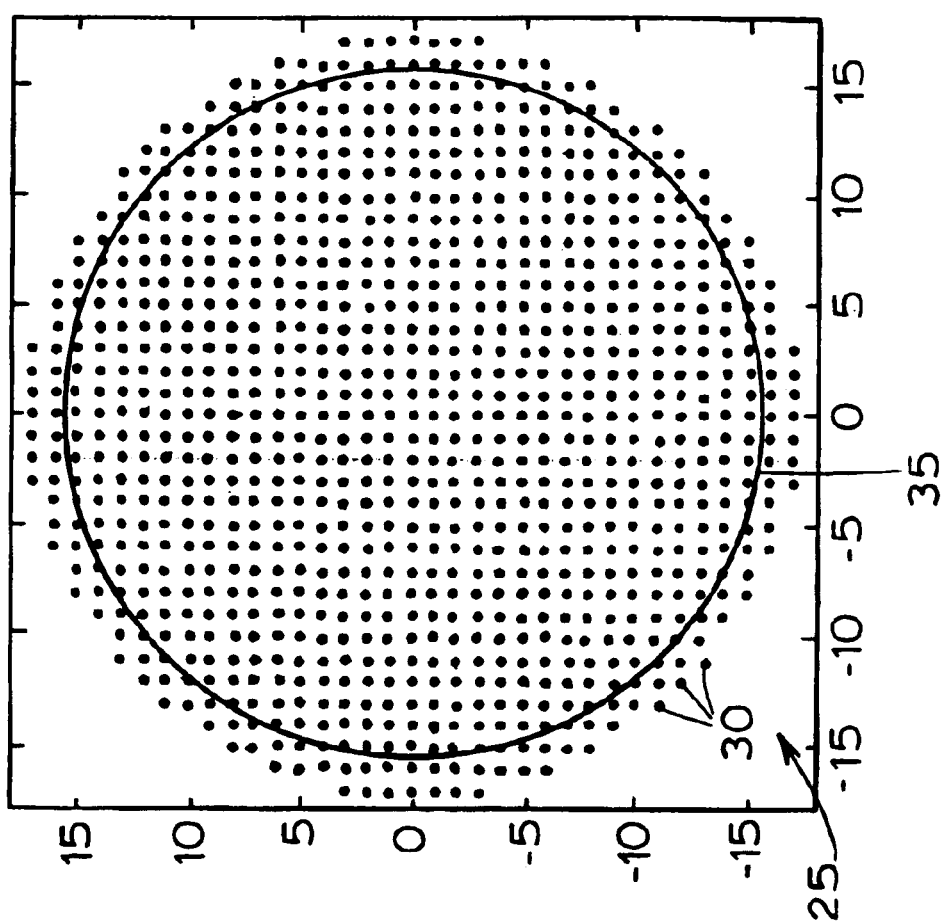
FIG. 2 is an illustration of a deformable mirror having a number of actuators used to move portions of the mirror in accordance with the present invention.

Turning now to FIG. 1, an adaptive optics imaging system (imaging system) 10 is shown. In operation the imaging system 10 receives a perturbed wavefront from some target 15 that is under observation. The perturbed wavefront is a bundle of light also called a ray bundle 17 that may be 3.5 meters in diameter. The ray bundle 17 is passed to an afocal telescope 20, which shrinks the ray bundle 17 to a smaller size (e.g., on the order of 40 centimeters (cm)). The shrunken ray bundle 22, or a portion thereof, is processed by the imaging system 10. The shrunken ray bundle 22 is coupled to a deformable mirror 25, which can be seen in greater detail in FIG. 2. The deformable mirror 25 includes a number of actuators 30 that are controlled to deform portions of the mirror to eliminate wavefront perturbations and minimize the effects of scintillations. The deformable mirror 25 may include several hundreds or thousands of actuators 30. In one particular embodiment the deformable mirror may have 941 actuators 30 that move 941 deformable sections. Reference numeral 35 denotes a pupil outline of the deformable mirror 25. When the shrunken ray bundle 22 reaches the deformable mirror 25, the majority of the shrunken ray bundle 22 must fall within the pupil outline 35 to ensure proper operation of the imaging system 10.

Returning to FIG. 1, after the shrunken ray bundle 22 is reflected off of the deformable mirror 25, it is passed to a beam steering mirror 40. The angle of the beam steering mirror 40 is controlled to direct the shrunken ray bundle 22 to a dichroic beamsplitter 45. The dichroic beamsplitter 45 may be embodied in a mirror that selectively passes and reflects various wavelengths of light. Specifically, the long wavelength light 47 from the shrunken ray bundle 22 passes through the dichroic beamsplitter 45 to an imaging camera 50. The imaging camera 50 is used to generate an image that is viewable on a display screen (not shown). The angle of the beam steering mirror 40 is controlled so that the long wavelength light 47 remains properly centered on the imaging camera 50, thereby generating a stable visual image for viewing.

The dichroic beamsplitter 45 reflects the short wavelength light 52 of the shrunken ray bundle 22 to a 50—50 beam splitter 55. The 50—50 beamsplitter 55, in turn, reflects half of the short wavelength light to a control loop that controls the beam steering mirror 40. The control loop contains an image tracking sensor 60, which is used to convert the short wavelength optical energy 52 into electrical signals, and a tracking processor 65. The electrical signals from the image tracking sensor 60 are passed to the tracking processor 65, which interprets the electrical signals and generates control signals that are used to control the angular position of the beam steering mirror 40. The tracking sensor 60 provides an output that is a representation of the target image. The tracking processor 65 receives the signal from the tracking sensor 60 and computes a centroid of the image. The tracking processor 65 output is a command to drive the beam steering mirror 40 in such a manner as to center the tracking sensor 60 image in its field-of-view. The tracking control loop and its associated components as shown are well known in the art. Such systems require care in design, but are in widespread use.

Figure 3:
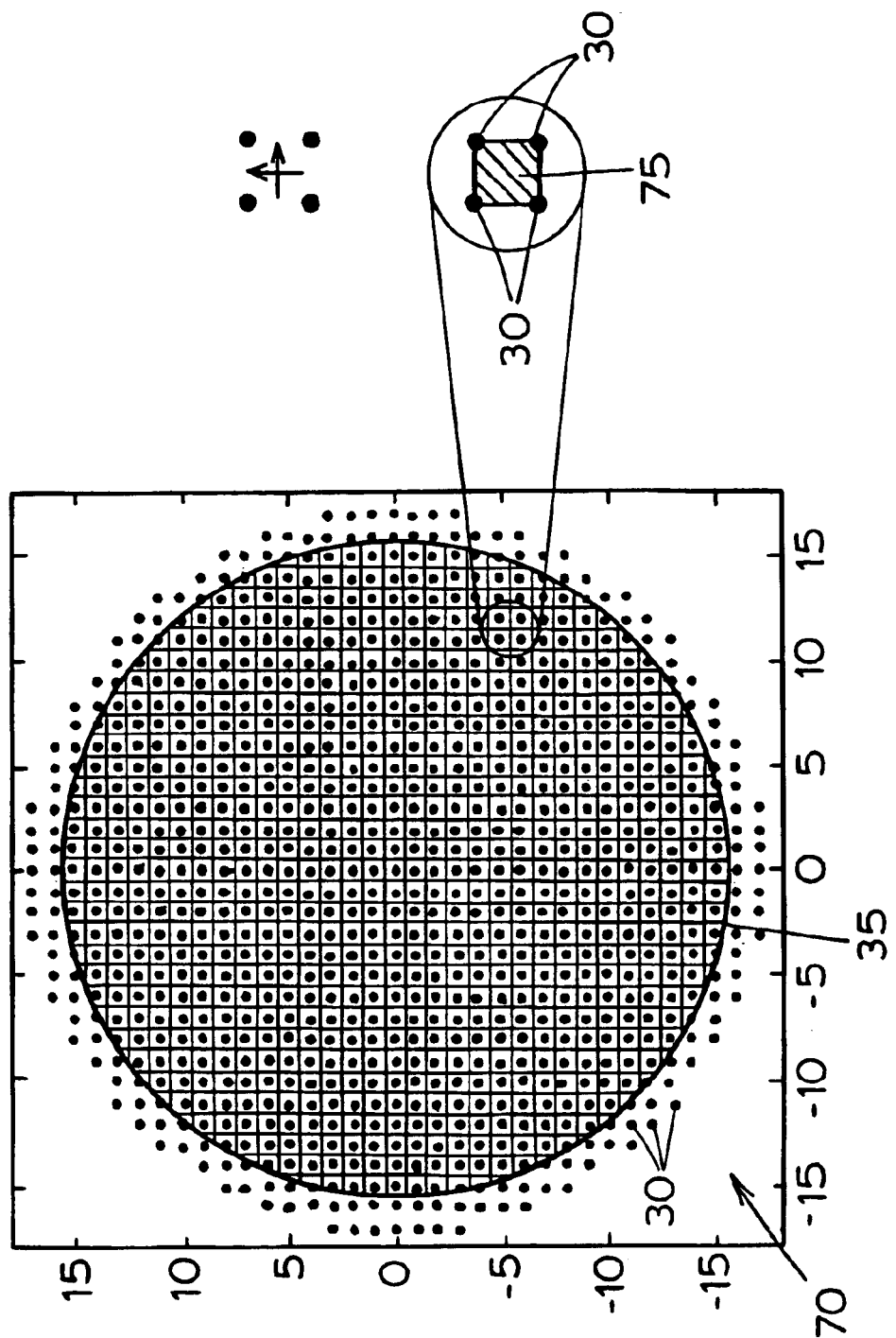
FIG. 3 is an illustration of a wavefront sensor that shows a number of actuators and a number of subapertures in accordance with the present invention.

The short wavelength light 52 that passes through the 50—50 beam splitter 55 is coupled to a deformable mirror control loop that is used to control the actuators 30, which control the deformable mirror 25. The deformable mirror control loop includes a wavefront sensor 70, a processor 80 and a servo compensator 85. The wavefront sensor 70 dissects the short wavelength light and determines the slope of light amplitude in the array of subapertures 75. As shown in FIG. 3, each subaperture 75 is surrounded by four actuators 30 that are superimposed onto the wavefront sensor 70 to show the relationship of the actuators 30 to the subapertures 75. The wavefront sensor 70 generates slope vectors and an amplitude vector for the light received at each subaperture 75. The wavefront sensor 70 receives the optical wavefront through the beamsplitter 55. The wavefront is divided into subapertures 75 (one subaperture 75 has four actuators 30 on its corners) each of which consists of a lens and a focal plane array of at least four detectors. The light energy of the wavefront incident on the subaperture lens is then focused on the focal plane detector array. The signals produced by the detectors from each subaperture 75 are combined to produce x and y axis signals that represent the deviation of the focal plane spot from the center of the array. Thus the output signals from all of the subapertures 75 represent the slopes of the wavefront error input to the wavefront sensor 70 after being corrected by the deformable mirror 25 and beam steering mirror 40.

The slope and amplitude vectors are passed to the processor 80 in the form of electrical signals. The output of the wavefront sensor 70 may be represented by $S^x_\alpha$, $S^y_\alpha$, and $A_\alpha$, which represent the x-slope, y-slope, and light amplitude of subaperture $\alpha$, where $\alpha$ represent the number of a subaperture. Generally, the processor 80 processes the slope and amplitude vectors in conjunction with a reconstruction matrix to generate a phase error signal. The phase error signal is coupled to the servo compensator 85, which interprets the phase error signal and generates a control vector that is used to control the deformable mirror 25. The servo compensator 85 is a filter that approximately time-integrates the phase error components.

Figure 4:
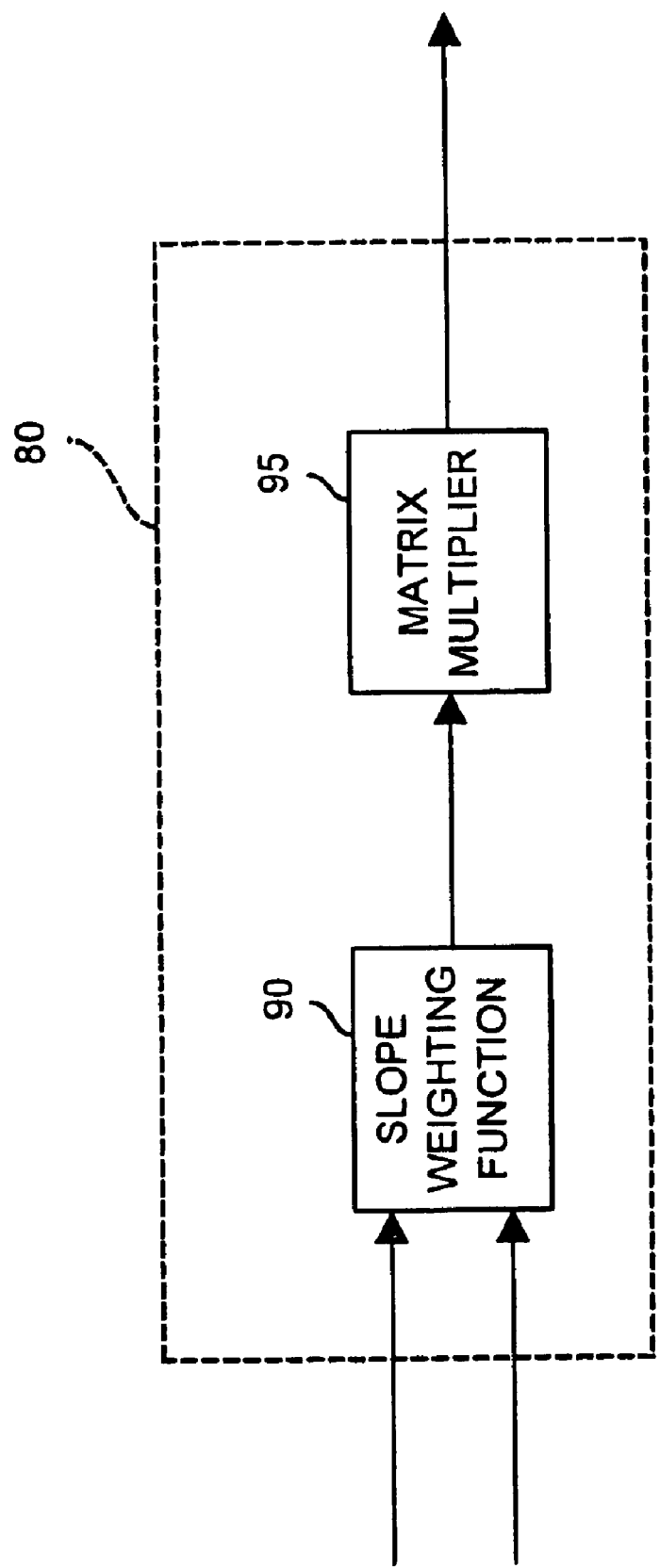
FIG. 4 is a more detailed representation of the processor shown in FIG. 1.

FIG. 4 is a detailed diagram representing the functions of the processor 80. The processor 80 includes a slope weighting function 90 and a matrix multiplier 95. In accordance with the present invention, the slope weighting function 90 uses the amplitude, or intensity, of the light in each subaperture 75 of the wavefront sensor 70 to weight the measured x and y-slopes from each subaperture 75. A high amplitude in a given subaperture 75, relative to the average amplitude over all subapertures, implies higher gain for that subaperture. In accordance with the present invention, this weighting function improves the performance of the imaging system 10 when scintillating signals are observed. The slope weighting function 90 calls for each wavefront sensor slope vector component to multiplied by the amplitude of that subaperture and divided by the average of all subaperture amplitudes. The x and y-slope components that are passed to the matrix multiplier 95 may be represented by equations 1–3.

$$\hat{S}_\alpha^x = S_\alpha^x \frac{A_\alpha}{A_{ave}} \quad \text{Equation 1}$$

$$\hat{S}_\alpha^y = S_\alpha^y \frac{A_\alpha}{A_{ave}} \quad \text{Equation 2}$$

$$A_{ave} = \frac{1}{N_{act}} \sum_{\beta=1}^{N_{act}} A_\beta \quad \text{Equation 3}$$

Wherein, $A_{ave}$ indicates the average amplitude across all subapertures, $A_\alpha$ represents the amplitude of a particular subaperture, $N_{act}$ represents the number of actuators 30 controlling the deformable mirror 25, and $\hat{S}^x$ and $\hat{S}^y$ represent the outputs of the x and y-slope outputs of the slope weighting function, respectively. For a system having no scintillation, the ratio of a specific subaperture amplitude ($A_\alpha$) to the average subaperture amplitude ($A_{ave}$) is one, and therefore has no effect on the slopes generated by the wavefront sensor 70. However, when scintillations occur, the subaperture amplitude is not equal to the average subaperture amplitude and therefore, the slope output of the slope weighting function 90 will change. The main effect of reduced amplitude across a subaperture is to reduce the signal to noise ratio of that subaperture. Information from low signal to noise subapertures is discarded and not passed to the matrix multiplier 95. The information discarded by de-weighting slopes is not significant because there are twice as many measurements going into the matrix multiplier 95 as are used. That is, the system is "over determined" and can afford to lose some information to reduce the overall noise of the system.

Information passed from the slope weighting function 90 is passed to the matrix multiplier 95, which performs the traditional functions of adaptive optics reconstruction. That is, the matrix multiplier 95 multiplies the weighted slope outputs by a reconstruction matrix. The functionality of a matrix multiplier, in the context of an adaptive optics reconstructor, is known to those skilled in the art. After matrix multiplication is complete, data is passed to a servo compensator 85, which controls the deformable mirror actuators 30.

Of course, it should be understood that a range of changes and modifications can be made to the preferred embodiment described above. For example, a variation on the simple multiplicative algorithm of the present invention is to use weighting equations 1–3 when a subaperture amplitude is less than the average amplitude and use no weighting when subaperture amplitude is greater than average amplitude. Accordingly, there is in this variation no extra weighting of good data, but there is de-weighting of noisy or scintillated data.

What is claimed is:

1. An adaptive optics system for minimizing the effects of scintillations on images received by the adaptive optics system, comprising:
   a deformable mirror that is illuminated with optical energy;
   a plurality of actuators for moving portions of the deformable mirror;
   a wavefront sensor comprising a plurality of subapertures for receiving optical energy that is reflected from the deformable mirror and for determining a slope and amplitude of the optical energy in each subaperture;
   a slope weighting function in communication with the wavefront sensor for receiving the slope and amplitude information for each subaperture from the wavefront sensor, for processing the amplitude information of the subapertures to produce an amplitude reference level, and for weighting each subaperture slope with a weighting function based on the corresponding subaperture amplitude and said amplitude reference level to produce weighted subaperture slopes; and
   a matrix multiplier in communication with the slope weighting function for receiving the weighted subaperture slopes and for generating control signals that control the actuators based on said weighted subaperture slopes.

2. The adaptive optics system of claim 1, wherein the slope weighting function increases the weight of slope measurements for subapertures having amplitudes higher than an average amplitude.

3. The adaptive optics system of claim 1, wherein the slope weighting function decreases the weight of slope of measurements for subapertures having amplitudes lower than an average amplitude.

4. The adaptive optics system of claim 1, wherein the slope weighting function processes the slope and amplitude information to produce an average amplitude measurement and weighted slopes.

5. The adaptive optics system of claim 4, wherein the weighted slopes are generated by multiplying the slope of the subaperture by the amplitude of that subaperture and dividing the slope by the average amplitude measurement.

6. The adaptive optics system of claim 4, wherein the average amplitude measurement is produced by taking the average of the amplitudes of all subapertures.

7. The adaptive optics system of claim 1, wherein each subaperture corresponds to a plurality of actuators.

8. The adaptive optics system of claim 1, wherein the deformable mirror is controlled by 941 actuators.

9. The adaptive optics system of claim 1, further comprising a servo compensator for controlling the actuators.

10. A method for minimizing the effects of scintillations on images received by an adaptive optics system, comprising the steps of:
    illuminating a deformable mirror with optical energy;
    receiving optical energy from the deformable mirror in a plurality of subapertures;
    determining a slope and amplitude of the optical energy received by each subaperture;
    processing the amplitude information of the subapertures to produce an amplitude reference level;

weighting each subaperture slope with a weighting function based on the corresponding subaperture amplitude and said amplitude reference level to produce weighted subaperture slopes;

moving portions of the deformable mirror using a plurality of actuators; and generating control signals that control the actuators based on said weighted subaperture slopes.

11. The method of claim 10, wherein the step of processing the slope and amplitude of the optical energy includes the step of increasing the weight of slope measurements for subapertures having amplitudes higher than an average amplitude.

12. The method of claim 10, wherein the step of processing the slope and amplitude of the optical energy includes the step of decreasing the weight of slope measurements for subapertures having amplitudes lower than an average amplitude.

13. The method of claim 10, wherein the step of processing the slope and amplitude of the optical energy includes the steps of producing an average amplitude measurement and weighted slopes.

14. The method of claim 13, wherein the weighted slopes are generated by multiplying the slope of the subaperture by the amplitude of that subaperture and dividing the slope by the average amplitude measurement.

15. The method of claim 13, wherein the average amplitude measurement is produced by taking the average of the amplitudes of all subapertures.

* * * * *